Feb. 10, 1925.
J. L. BEATON
CUTTING SHEARS
Filed Oct. 20, 1923
1,525,974
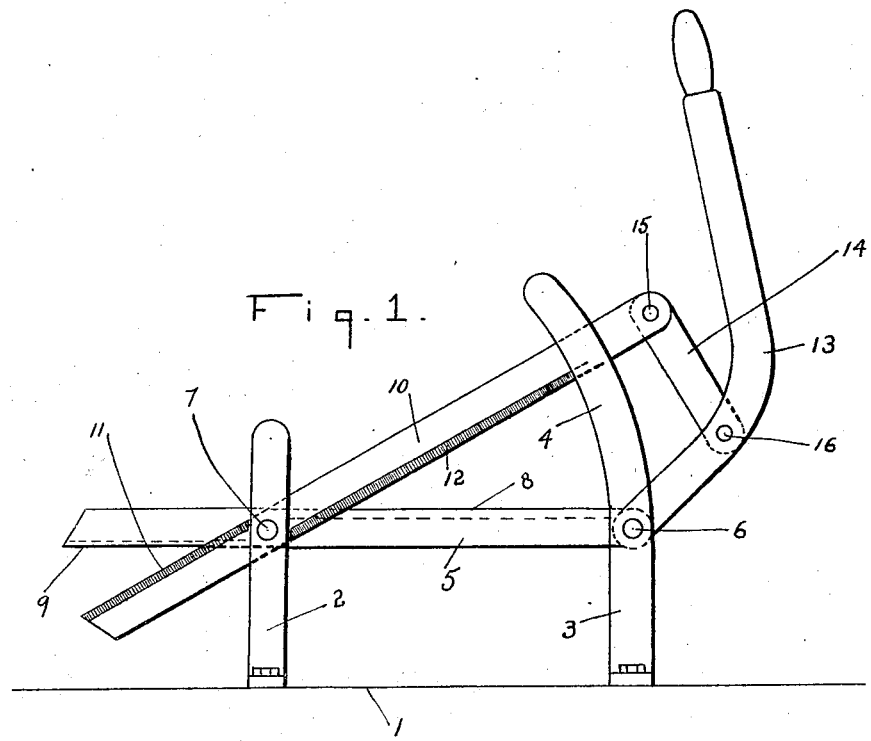
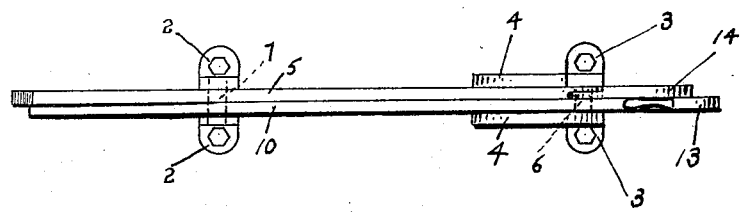
INVENTOR
J. L. BEATON.
BY Patented Feb. 10, 1925.

1,525,974

UNITED STATES PATENT OFFICE.

JOHN LORNE BEATON, OF STAVELY, ALBERTA, CANADA.

CUTTING SHEARS.

Application filed October 20, 1923. Serial No. 669,881.

*To all whom it may concern:*

Be it known that I, JOHN LORNE BEATON, a subject of the King of Great Britain, and a resident of the town of Stavely, in the Province of Alberta, Canada, have invented certain new and useful Improvements in Cutting Shears, of which the following is the specification.

My invention relates to improvements in cutting shears and the object of the invention is to devise a cutting shears particularly for use on hot iron, which in addition to permitting the iron to be cut crosswise will permit it to be cut lengthwise.

My invention consists of a cutting shears constructed and arranged all as hereinafter more particularly described and illustrated in the accompanying drawing in which:

Fig. 1 represents a side elevation of a shears constructed according to my invention, and Fig. 2 is a plan view thereof.

Like characters of reference indicate corresponding parts in the different views.

1 is a suitable base to which are secured the bifurcated bearing brackets 2 and 3, the bearing bracket 3 being higher than the bearing bracket 2 and having an arc-shaped upper end 4. 5 is a blade suitably secured to the bracket 3 by the pin 6 and to the bracket 2 by the pin 7, said blade being positioned between the bifurcated portions of such bracket and having the upper cutting edge 8 disposed between the brackets 2 and 3 and the lower cutting edge 9 disposed at the opposite end of the blade to the end which is secured to the bracket 3.

10 is a swingable blade mounted on the bracket 2 by means of the pin 7 and having the other end engaging one of the arc-shaped upper ends of the bifurcated bracket 3. 11 is an upper cutting edge on the swingable blade 10 adapted to co-act with the upper cutting edge 8 on the fixed blade 5.

13 is an operating lever pivotally connected to the bifurcated portions of the bracket 3 by the pin 6 which secures the corresponding end of the blade 5 in position and 14 is a link pivotally connected at one end to one end of the blade 10 by the pin 15 and at the other end to the lever 13 intermediately of the length of the same by the pin 16, said lever 13 being preferably bent in an upward direction as illustrated in Figure 1 of the drawing.

On actuating the lever 13 in a downward direction it will be apparent that the co-acting cutting edges 8 and 12 and 9 and 11 will come together, thus shearing any metal that is placed between them.

The cutting edges 9 and 11 are particularly applicable for shearing metal lengthwise or diagonally, as for instance in making plough points wherein the bar from which the point is made would be inserted diagonally between the cutting edges 9 and 11 and cut half through and then reversed, the other half being cut through diagonally so that a pointed end will be given to the bar.

The cutting edges 12 and 8 are particularly designed to cut the metal transversely.

From the above description it will be seen that I have devised a simple and effective shears that will be provided with cutting edges designed for shearing metal, particularly hot iron, both transversely as well as lengthwise and diagonally.

What I claim as my invention is.

1. A cutting shears, comprising a base, a pair of spaced apart bifurcated brackets secured to the base, a fixed blade secured to the brackets and having a portion protruding beyond one of the brackets, said blade having an upper cutting edge on the portion positioned between the brackets, and a lower cutting edge on the protruding portion, a swingable blade pivoted intermediately of its length to the forward bracket, and having an upper cutting edge coacting with the lower cutting edge on the protruding portion and a lower cutting edge coacting with the upper cutting edge of the fixed blade.

2. A cutting shears, comprising a base, a pair of spaced apart bifurcated brackets secured to the base, a fixed blade secured to the brackets and having a portion protruding beyond one of the brackets, said blade having an upper cutting edge on the portion positioned between the brackets, and a lower cutting edge on the protruding portion, a swingable blade pivoted intermediately of its length to the forward bracket and having an upper cutting edge coacting with the lower cutting edge on the protruding portion and a lower cutting edge coacting with the upper cutting edge of the fixed blade, an arc-shaped extension on the rear bracket constituting a guide for the rear end of the swingable blade, an operating lever pivoted to the rear bracket, and a link pivotally connected at one end to the lever intermediately of its length and at the other end to the rear end of the swingable blade.

JOHN LORNE BEATON.